(12) United States Patent
Kollin et al.

(10) Patent No.: US 12,320,973 B2
(45) Date of Patent: Jun. 3, 2025

(54) DYNAMIC CONTROL OF WAVEGUIDE EYE BOX

(71) Applicant: Microsoft Technology Licensing, LLC, Redmond, WA (US)

(72) Inventors: Joel Steven Kollin, Seattle, WA (US); Ishan Chatterjee, Mountain View, CA (US); Benjamin Eliot Lundell, Seattle, WA (US); Christopher Charles Aholt, Newcastle, WA (US); Maria Esther Pace, Palo Alto, CA (US); Andreas Georgiou, Cambridge (GB); Robert Thomas Held, Seattle, WA (US); Mark Theodore Bolas, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 658 days.

(21) Appl. No.: 17/649,444

(22) Filed: Jan. 31, 2022

(65) Prior Publication Data

US 2023/0244077 A1     Aug. 3, 2023

(51) Int. Cl.
*G02B 27/00* (2006.01)
*G02B 5/18* (2006.01)
*G06F 3/01* (2006.01)

(52) U.S. Cl.
CPC ....... *G02B 27/0081* (2013.01); *G02B 5/1828* (2013.01); *G02B 27/0093* (2013.01); *G06F 3/013* (2013.01)

(58) Field of Classification Search
CPC .. G02B 27/01; G02B 27/017; G02B 27/0172; G02B 27/0179; G02B 27/0081;
(Continued)

(56) References Cited

U.S. PATENT DOCUMENTS 6,352,344 B2    3/2002   Tidwell
8,548,290 B2   10/2013   Travers et al.
(Continued)

FOREIGN PATENT DOCUMENTS

WO    2021096447 A1    5/2021

OTHER PUBLICATIONS

"Invitation to Pay Additional Fee Issued in PCT Application No. PCT/US23/010250", Mailed Date: May 12, 2023, 10 Pages.
(Continued)

*Primary Examiner* — Sultan Chowdhury
(74) *Attorney, Agent, or Firm* — Alleman Hall & Tuttle LLP

(57) ABSTRACT

One disclosed example provides a near-eye display device. The near-eye display device comprises an eye tracking system configured to determine a position of an eye of a user relative to the near-eye display device, and a waveguide including at least an input coupler and an output coupler, the output coupler including a plurality of zones, each zone activatable via a dynamically controllable output coupling element of the zone. The near-eye display device further comprises an image source configured to output image light to the input coupler, and a controller configured to selectively activate one or more zones of the output coupler based at least on the position of the eye.

20 Claims, 11 Drawing Sheets

(58) Field of Classification Search
CPC .............. G02B 27/0093; G02B 27/283; G02B 5/1814; G02B 5/1819; G02B 5/1823; G02B 5/1828; G02B 2027/014; G02B 2027/0138; G02B 2027/0174; G02B 2027/0178; G02B 2027/0187; G06F 3/00; G06F 3/005; G06F 3/012; G06F 3/013; G06F 3/015
See application file for complete search history.

(56) References Cited

U.S. PATENT DOCUMENTS

| | | |
|---|---|---|
| 10,185,393 B2 | 1/2019 | Sulai et al. |
| 10,670,866 B2 | 6/2020 | Yang et al. |
| 2015/0168210 A1* | 6/2015 | Dorschner ............ G01J 1/0429 250/225 |
| 2018/0045960 A1* | 2/2018 | Palacios ................ G02F 1/1343 |
| 2018/0120559 A1* | 5/2018 | Yeoh .................. G02B 26/0833 |
| 2019/0155046 A1* | 5/2019 | Wall ........................ G06F 3/013 |
| 2019/0293853 A1* | 9/2019 | Ayres ................... G02B 5/1814 |
| 2021/0033857 A1* | 2/2021 | Waldern ................ G02B 6/005 |
| 2021/0191122 A1 | 6/2021 | Yaroshchuk et al. |
| 2021/0199970 A1 | 7/2021 | Huang et al. |
| 2021/0262854 A1* | 8/2021 | Brueck ............ H01L 31/02164 |

OTHER PUBLICATIONS

"International Search Report and Written Opinion Issued in PCT Application No. PCT/US23/010250", Mailed Date: Jul. 3, 2023, 16 Pages.

Hedili, et al., "Light-efficient augmented reality display with steerable eyebox", In Journal of Optics Express, vol. 27, Issue 9, Apr. 29, 2019, pp. 12572-12581.

* cited by examiner

DYNAMIC CONTROL OF WAVEGUIDE EYE BOX

BACKGROUND

Augmented reality and virtual reality devices may utilize near-eye displays to present image data. In particular, augmented reality devices may utilize see-through near-eye display devices to allow computer-generated imagery to be presented alongside real-world images. In such devices, one or more optical waveguides may be used to direct light from an image source along an optical path toward a user's eye(s).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

One disclosed example provides a near-eye display device. The near-eye display device comprises an eye tracking system configured to determine a position of an eye of a user relative to the near-eye display device, and a waveguide including at least an input coupler and an output coupler, the output coupler including a plurality of zones, each zone activatable via a dynamically controllable output coupling element of the zone. The near-eye display device further comprises an image source configured to output image light to the input coupler, and a controller configured to selectively activate one or more zones of the output coupler based at least on the position of the eye.

DETAILED DESCRIPTION

Various near-eye display devices, such as some head-mounted display (HMD) devices, utilize transparent waveguides for delivering images from an image source to an eye of a user. In an HMD, such waveguides may be arranged directly in front of each eye of a user. This allows the presentation of augmented reality imagery that appears to be overlaid or integrated within the user's surrounding physical environment.

As described in more detail below, to enlarge a volume of space within which a full field-of-view (FOV) of displayed images can be viewed, the FOV of a displayed image may be replicated multiple times by one or more gratings within a waveguide. Replicating the FOV of displayed images may allow for a user to maintain a view of the presented imagery despite movement of the eye relative to the near-eye display. However, such replication also results in outputting much light that is not viewed, which may consume power inefficiently.

Accordingly, examples are disclosed herein that relate to a waveguide including an output coupler comprising a plurality of zones each including a dynamically controllable output coupling element. As described in more detail below, zones of the output coupler can be controllably activated or deactivated based on eye-tracking and image data. This allows for the production of a relatively smaller, movable eye box (a region of space in which a projected image is fully viewable) that is generated with higher light efficiency than the use of a larger fixed-location eye box. The reduction in eye box size and the segmentation of the output coupler may also allow for improved image quality.

Figure 1:
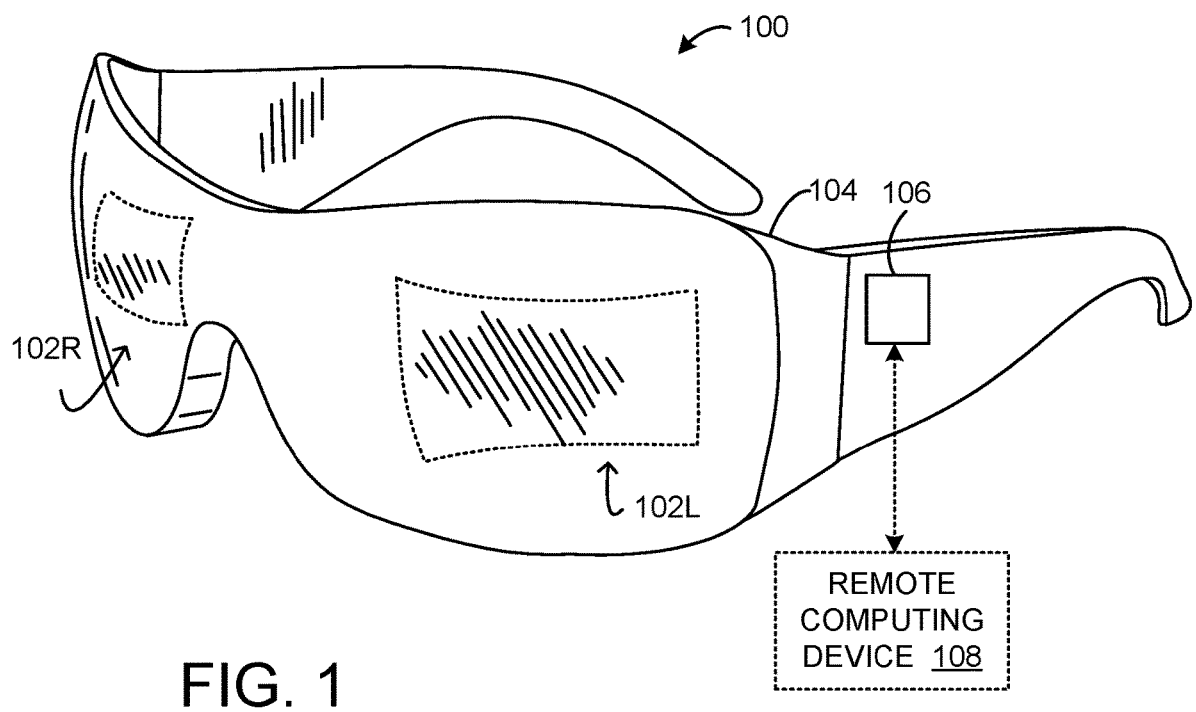
FIG. 1 schematically shows an example head mounted display including a near-eye display device.

FIG. 1 shows an example near-eye display device 100. Display device 100 includes right-eye and left-eye near-eye display systems 102R and 102L mounted to a frame 104 configured to rest on a wearer's head. Each of the right-eye and left-eye near-eye display systems 102R, 102L includes image display componentry comprising one or more waveguides configured to project computer-generated virtual imagery into left and right eyes of a wearer of the display device 100.

In some implementations, the right-eye and left-eye near-eye display systems 102R and 102L include a viewing aperture that is wholly or partially transparent from the perspective of the wearer, to give the wearer a view of a surrounding real-world environment. In other implementations, the viewing apertures of the right-eye and left-eye near-eye display systems 102R, 102L are opaque, such that the wearer is completely absorbed in virtual-reality (VR) imagery provided via the near-eye display device. In yet other implementations, the opacities of the viewing apertures of the right-eye and left-eye near-eye display systems 102R, 102L may be dynamically controlled via a dimming filter.

Display device 100 further includes an on-board computing system in the form of a controller 106 configured to render the computerized display imagery via the right-eye and left-eye near-eye display systems 102R, 102L. The controller 106 is configured to send appropriate control signals to the right-eye near-eye display system 102R to form a right-eye image of a stereoscopic pair of images. Likewise, the controller 106 is configured to send appropriate control signals to left-eye near-eye display system 102L to form a left-eye image of the stereoscopic pair of images.

The controller 106 may include a logic subsystem and a storage subsystem, as discussed in more detail below with respect to FIG. 10. Operation of the display device 100 additionally or alternatively may be controlled by one or more remote computing device(s) 108 (e.g., in communication with a display device 100 via a local area network and/or wide area network).

Figure 2A:
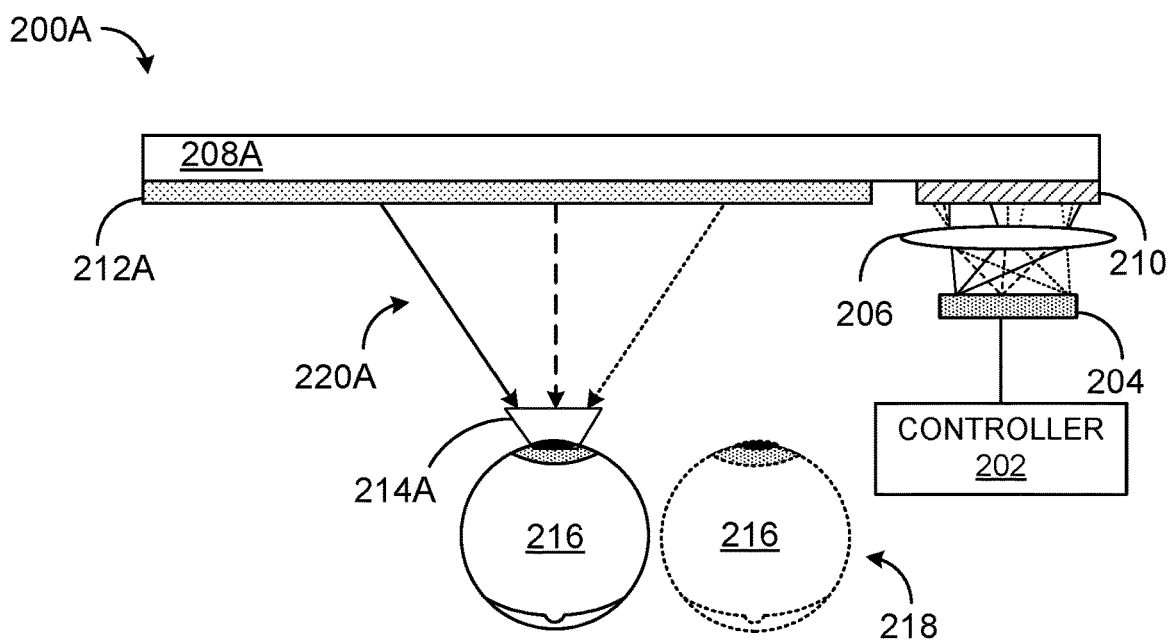
FIGS. 2A-2C schematically show example near-eye display devices and illustrate the replication of a field-of-view to increase an eye box size.
Figure 2B:
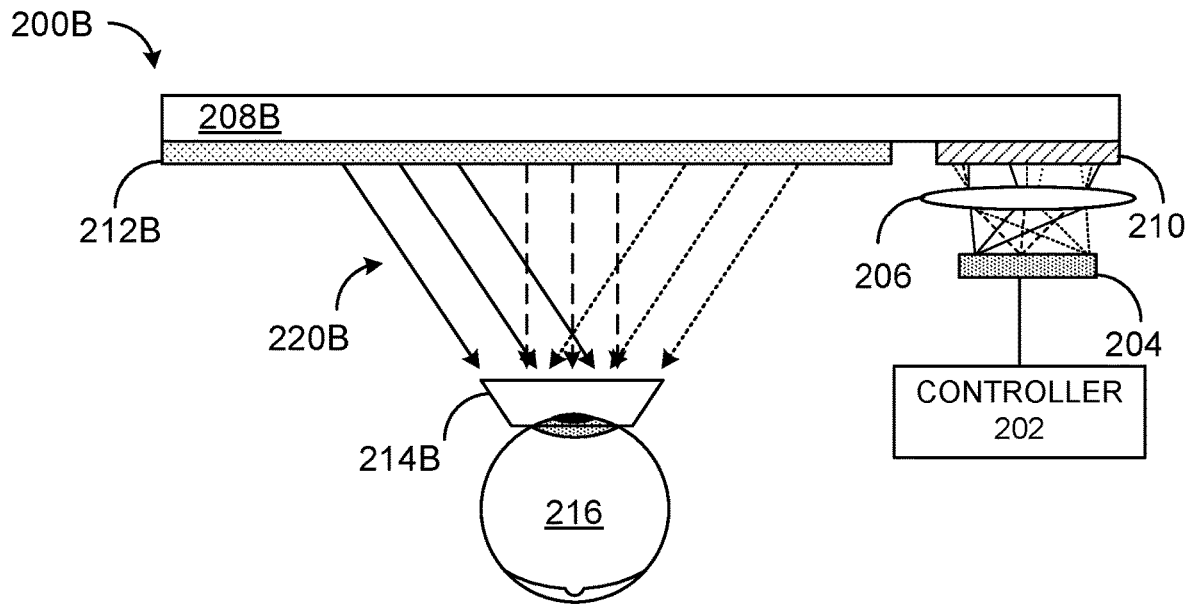
Figure 2C:
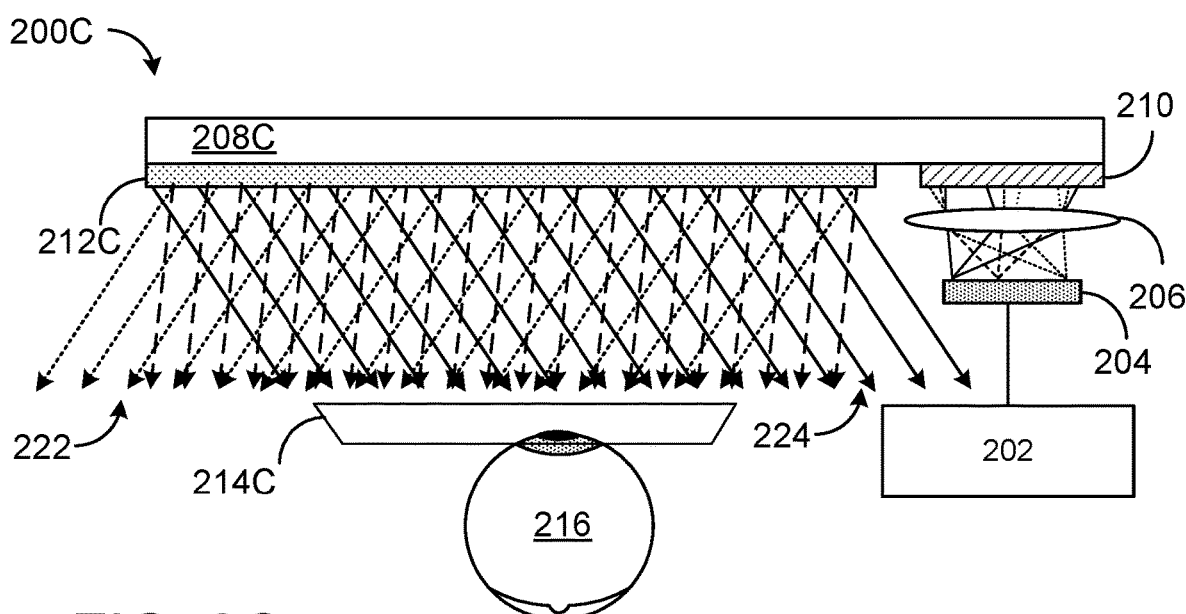

FIGS. 2A-2C schematically illustrate the production of relatively larger eye boxes by replicating a FOV of a displayed image. This technique also may be referred to as pupil replication. Referring first to FIG. 2A, near-eye display device 200A includes a controller 202 communicatively coupled to and configured to control image source 204. Image source 204 may comprise any suitable components for forming an image. Examples include an emissive image-producing panel (e.g. organic light emitting diode (OLED) microdisplay), or a spatial light modulating (SLM) panel such as a liquid crystal on silicon (LCOS) display or digital micromirror device (DMD). In such examples, an image is formed by controlling emission or modulation of light at each pixel of the panel. In other examples, image source 204 may comprise a scanning microelectromechanical system (MEMS)-based scanning system that can raster scan an image. Additionally or alternatively, the image source may comprise a pixelated dynamic hologram, such as a phase modulating LCOS or DMD panel.

Light from image source 204 is transformed to the angular domain via one or more lenses (shown schematically as lens 206) for input into waveguide 208A by an input coupler 210. Input coupler 210 may comprise any suitable structure that couples light into waveguide 208A. Example structures for input coupler 210 include various diffractive structures, such as surface relief gratings, polarization gratings, volume holograms, and/or other suitable grating structures. In other examples, input coupler 210 may include refractive or reflective structures, such as one or more prisms. The incoupled light from each pixel of image source 204 corresponds to a small set or bundle of angles, represented here as single-angle rays, with an angular range that is proportionate to the size of the pixel. Light from image source 204 exits waveguide 208A via output coupler 212A. Output coupler 212A is configured to direct light to an eye box 214A of the near-eye display device 200A, allowing projected imagery to be viewed by an eye 216 having a pupil positioned within the eye box 214A. In this position, eye 216 sees a FOV based on the light rays 220A coming into the pupil from different directions.

In the absence of pupil replication, eye box 214A may be relatively small. Thus, if eye 216 is positioned at position 218, the pupil is outside of eye box 214A. In this position, light rays 220A, and thus the projected image, are no longer visible to the user.

As such, to accommodate different eye positions (e.g., for different users and/or for a device resting on a user's head in different positions), turning structures and outcoupling structures (e.g., gratings) of a waveguide may be configured such that the entire FOV is coupled out multiple times by pupil replication, each replica slightly shifted in space. FIG. 2B shows light rays from image source 204 copied three times in a waveguide 208B of a near-eye display system 200B. The copied light rays are output by an output coupler 212B as light rays 220B. The efficiency of gratings used to replicate the rays may taper across the spatial extent of the waveguide. As more light energy is present closer to the image source, less efficient gratings may be used closer to the image source, and more efficient gratings may be used farther from the image source, to achieve a suitably consistent luminance across the eye box. Where the pupil replication is sufficiently dense (e.g., the replication pitch is smaller than user's pupil size), a larger eye box 214B is formed. This may allow a user to view a full FOV of an HMD incorporating near-eye display device 200, even where near-eye display device 200 and eye 216 change relative positions, as long as a pupil of eye 216 stays within eye box 214B. While FIG. 2B shows replication in one dimension (horizontal), in other examples replication can be carried out in two dimensions (e.g., vertical and horizontal).

A waveguide can be designed with turning structures and/or outcoupling structures to generate a greater number of replications for an even larger eye box. Referring to near-eye display device 200C of FIG. 2C, waveguide 208C replicates the light rays from image source 204 numerous times to output a larger eye box 214C via output coupler 212C. Eye box 214C may accommodate a wide range of eye locations. However, light is continuously being delivered to a large volume of space, regardless of where eye 216 is located. Since eye 216 is only in one place at a time within eye box 214C, a majority of the emitted light is wasted by generating regions of eye box 214C in which eye 216 is not located. Further, some light is directed to fringe regions 222, 224 outside of eye box 214C. Fringe regions 222, 224 do not generate a full FOV, but rather a clipped or partial view of the image. Thus, the generation of eye box 214C as illustrated can be inefficient.

To help address such issues, a near-eye display device may comprise an output coupler configured to allow the dynamic adjustment of an eye box location. In this way, a FOV of image light may be controllably output to a smaller, dynamically moveable eye box, rather than being output to a larger, static eye box such as that of FIG. 2C. This may help to reduce the output of unviewed image light and conserve power.

Figure 3:
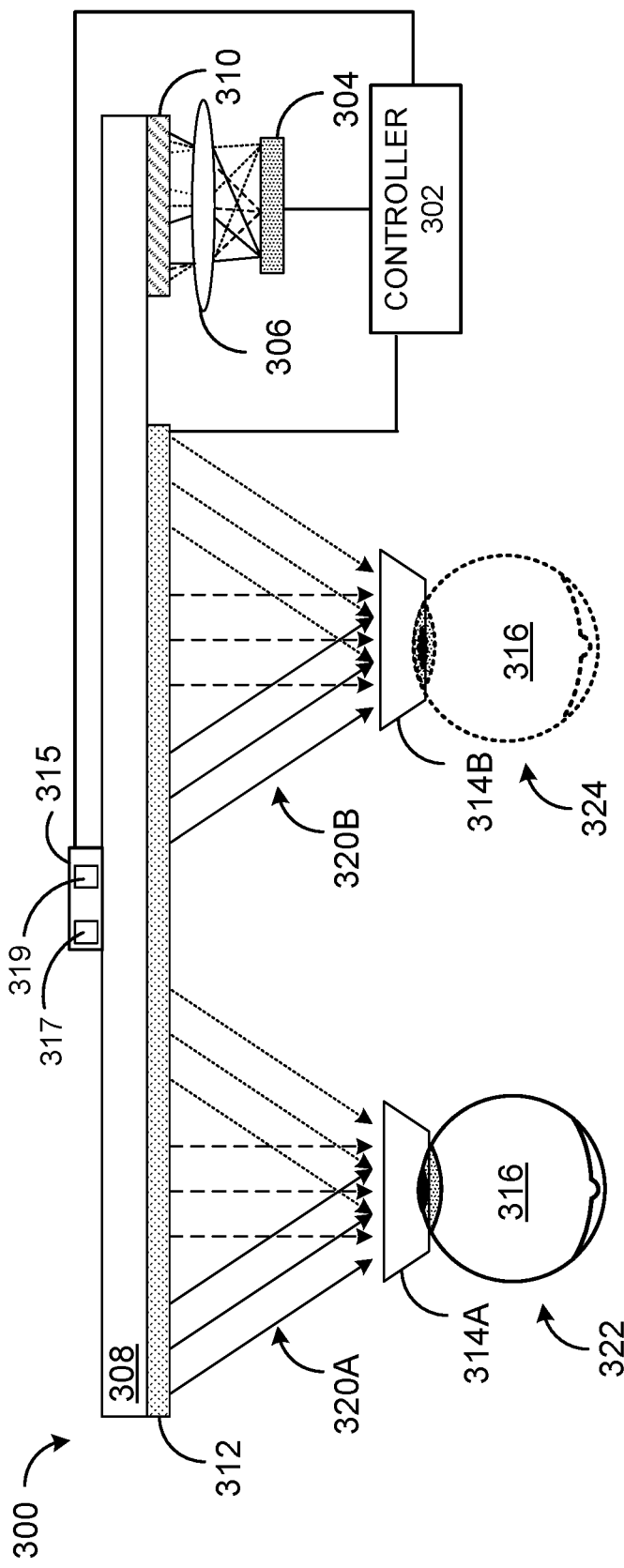
FIG. 3 schematically shows an example near-eye display device configured to vary a location of an eye box.

FIG. 3 schematically illustrates a near-eye display device 300 configured to dynamically adjust the position of an eye box based on a position of the user's pupil. Near-eye display device 300 includes a controller 302, an image source 304, one or more lenses 306, a waveguide 308 configured to replicate a FOV of an image from image source 304, an input coupler 310 for waveguide 308, an output coupler 312 for waveguide 308, and an eye-tracking system 315 configured to track a user's eye 316. Near-eye display device 300 is shown as directing light to a single eye 316, but may be configured to direct to two eyes or to be coupled as half of a pair of near-eye display devices, each device directing light to one eye of a user.

Output coupler 312 is configured to output light to a relatively modest-sized eye box (e.g., eye box 314A) compared to eye box 214C of FIG. 2C. Output coupler 312 comprises a plurality of zones each comprising a dynamically controllable output coupling element, as described in more detail below. The zones of output coupler 312 are controllable by controller 302 to position the eye box based at least upon a determined location of eye 316 relative to near-eye display device 300. For example, image light is projected to eye box 314A when eye 316 is in position 322, and to eye box 314B when eye 316 is in position 324 as determined by eye tracking system 315. The smaller sizes of eye boxes 314A and 314B compared to eye box 214C of FIG. 2C allows eye 316 to see a full projected FOV from a similar range of locations as eye box 214C, with less wasted light than eye box 214C. In this manner, a full FOV of a projected image may be maintained at relatively lower power compared to producing the larger static eye box 214C of FIG. 2C.

Eye tracking system 315 can determine a location of eye 316 in any suitable manner. For example, eye tracking system 315 may include one or more light sources 317 that project light onto eye 316, and an image sensor 319 that captures images of the pupil and reflections from the light sources. The locations of the reflections and the pupil in an image can be used to determine a position of eye 316 (e.g., a pupil position or position of other suitable eye structure) relative to near-eye display device 300. Eye tracking system 315 further is configured to provide a determined eye position to controller 302.

Controller 302 can use the determined eye position to position projected virtual images within a FOV via control of image source 304, and to control dynamically controllable output coupler 312 to output the projected virtual images to a suitable eye box location, as described above. In some examples, eye boxes 314A and 314B can be sized to slightly overfill the diameter of the pupil. In such examples, the eye tracking may not need to be performed with particularly high accuracy, as long as latency is suitably low.

Figure 4A:
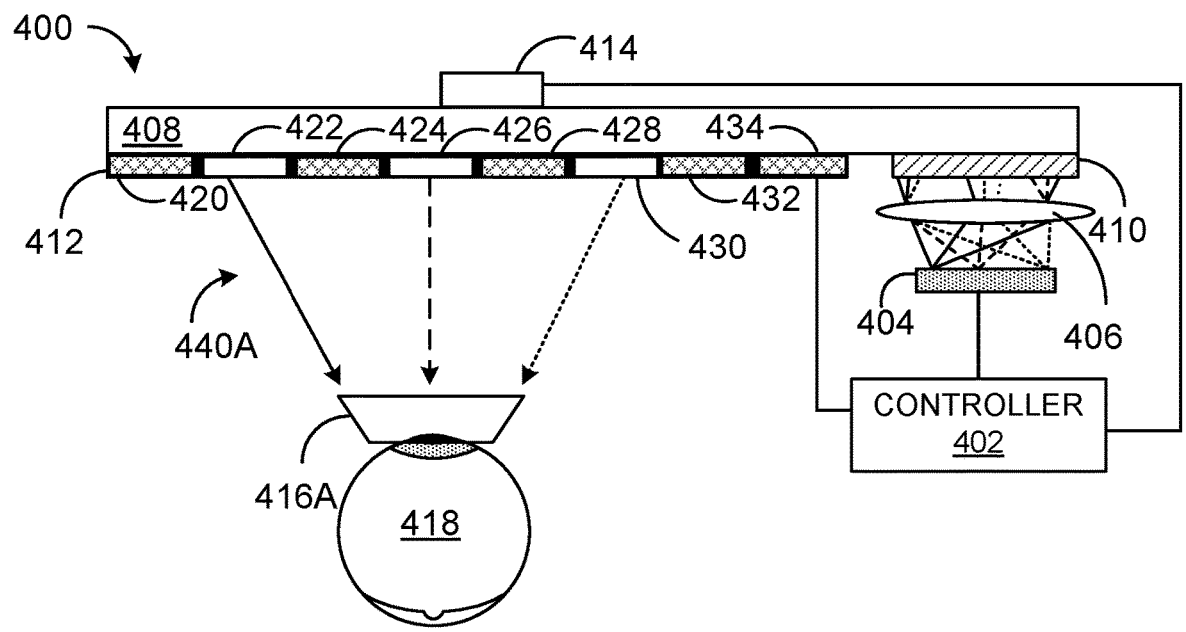
FIGS. 4A-4B schematically show an example near-eye display device comprising an output coupler with zones each comprising a dynamically controllable output coupling element activatable to vary a location of an eye box.
Figure 4B:
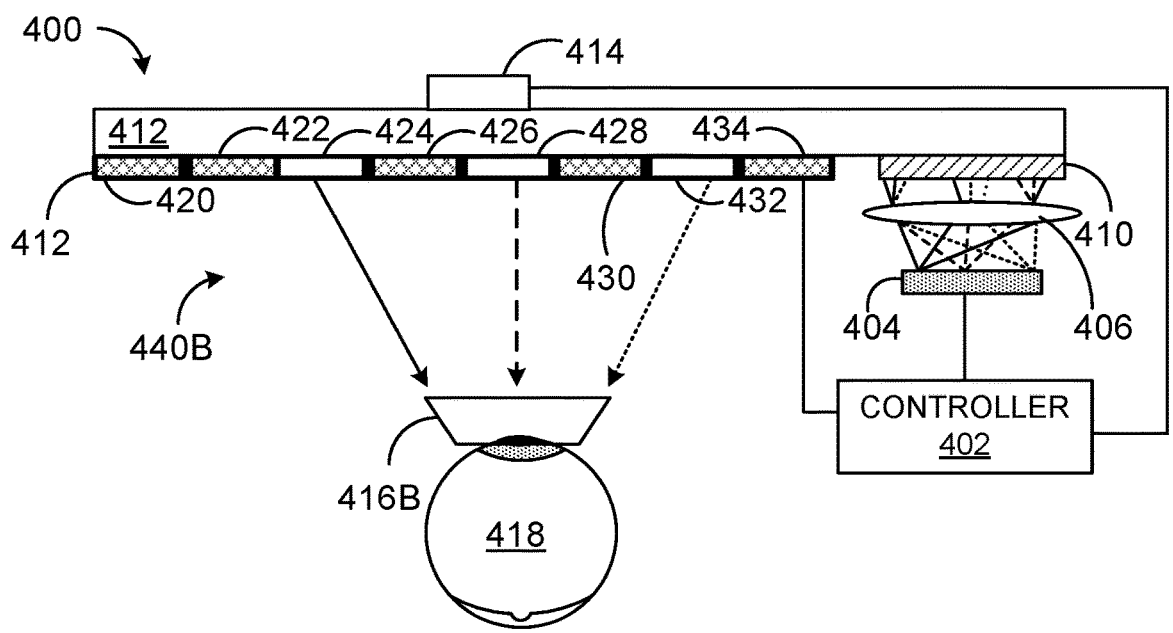

Any suitable mechanism for selectively generating an eye box based on eye tracking data may be used. For example, all or part of a static output coupler grating may be replaced or augmented with a plurality of dynamically controllable output coupling elements, each of which can be controlled to output light or not output light. FIGS. 4A and 4B schematically show an example near-eye display device 400 having such an output coupler. Near-eye display device 400 is an example of near-eye display device 300. Near eye display device 400 includes controller 402, image source 404, lens 406, waveguide 408, input coupler 410, output coupler 412, and eye tracking system 414.

Dynamically controllable output coupler 412 includes a plurality of individually controllable zones 420, 422, 424, 426, 428, 430, 432, and 434. Each individually controllable zone includes a dynamically controllable output coupling element, such as a switchable grating, examples of which are discussed below. Each individually controllable zone may be controlled to be selectively emitting (on/activated), such that light is outcoupled, or non-emitting (off/de-activated) such that light is not outcoupled. In FIGS. 4A and 4B, a cross-hatched pattern in a zone indicates a deactivated/non-emitting state. In some examples, the dynamically controllable output coupling element of each of one or more zones is biased-on (e.g., emitting in the absence of a control signal). Likewise, in some examples, one or more zones may be biased-off (e.g., non-emitting in the absence of a control signal).

Each individually controllable zone may be discrete, having finite boundaries on their respective waveguide positions, or may be continuous on an analog gradient with fully controllable boundaries on waveguide 408. Similarly, the angular selectivity of each individually controllable zone may be discrete and directly linked to their position on their respective position on waveguide 408, or may be variable and thus vary gradually (e.g., linearly) across the surface of waveguide 408.

Similarly, the efficiencies of each individually controllable zone may progressively increase along waveguide 408. Zones positioned physically closer to input coupler 410 (e.g., zone 434) may have lower efficiencies so that some light is transmitted down output coupler 412, allowing one or more other zones to be activated concurrently. Zones positioned physically distal to input coupler 410 (e.g., zone 420) may have higher efficiencies. In this way, uniform brightness can be achieved across waveguide 408. The tapering may be gradual/analog across output coupler 412, may be discretely diminishing zone-by-zone as the distance from input coupler 410 decreases, or a combination, wherein each zone features its own internal tapering.

Emission at each zone may be controlled in a binary on/off fashion. As such, zones positioned physically farther from input coupler 410 may switch between 0 and x percent efficiency, while zones positioned physically closer to input coupler 410 may switch between 0 and y percent efficiency, wherein x>y.

Output coupler 412 is controllable by controller 402 to position an eye box 416 in response to a detected location of eye 418 as determined by eye tracking system 414. In FIG. 4A, zones 422, 426, and 430 are activated (corresponding to light rays originating at edge and central pixel locations on image source 404), collectively emitting a set of light rays 440A to form eye box 416A. In FIG. 4B, zones 424, 428 and 432 are activated to emit set of light rays 440B to form eye box 416B, based upon the different location of eye 418. FIGS. 4A and 4B may represent emission at a single point in time, or light that is output over a duration integration time for eye 418, where the zones are operated in a time multiplexed manner.

In some examples, output coupler 412 be controlled to reduce an amount of light directed through peripheral zones (e.g., volumes of space that are peripheral to eye boxes 416A and 416B). Further, in some examples, one or more zones positioned towards the periphery of waveguide 408 may be configured to be biased off, while centrally located zones are configured to be biased on. In this way, if a user (or an intended population of users) is likely to activate certain zones only occasionally, such as peripheral zones, those zones may be biased off, so that energy is not spent providing a de-activation signal to maintain a deactivated state. In some examples, zones closer to input coupler 410 corresponding to a central eye box area (e.g., a central area of the output coupler in this example, or of a folding grating in another example) may be utilized for most users, and thus may have non-switchable gratings that always emit light. In contrast, peripheral zones (e.g., zones 420, 422) may be switchable. Such a switchable peripheral zone may be activated by eye tracking when suitable, such as when the user's pupil rotates into the eye box generated by peripheral zones or the user has a relatively small or large interpupillary distance putting them outside the central eye box.

Figure 5A:
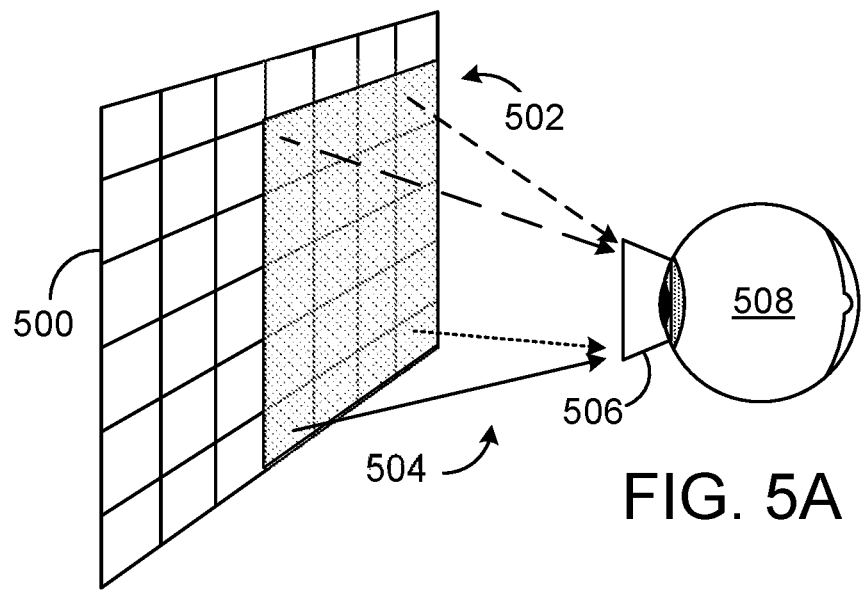
FIG. 5A schematically shows an example output coupler comprising individually controllable zones arranged along two dimensions.

In the example of FIGS. 4A-4B, output coupler 412 comprises controllable output coupling elements arranged along one dimension. FIG. 5A schematically shows an example output coupler 500 comprising controllable output coupling zones 502 arranged in a two-dimensional grid, where each zone comprises a dynamically controllable output coupling element. One or more zones may be activated at a time by a controller (not shown in FIG. 5A). Output coupling element 500 is another example of a dynamically controllable output coupling element suitable for use in near-eye display device 300.

Light rays 504 emitted through one or more activated zones 502 may be combined to form an eye box 506 in which a pupil of eye 508 is positioned. Output coupler 500 is illustrated with twenty contiguous zones 502 active, with rays from four activated corner zones 502 illustrated. The activated zones may be activated simultaneously, sequentially, randomly, or in any other suitable manner, over the course of an eye integration period (a duration over which an eye receives light for an image frame). In other examples, non-contiguous zones may be activated to emit light to form eye box 506, depending upon imagery being displayed and/or a location of eye 508. Further, as mentioned above, in some examples peripheral zones may be biased off to save power.

Figure 5B:
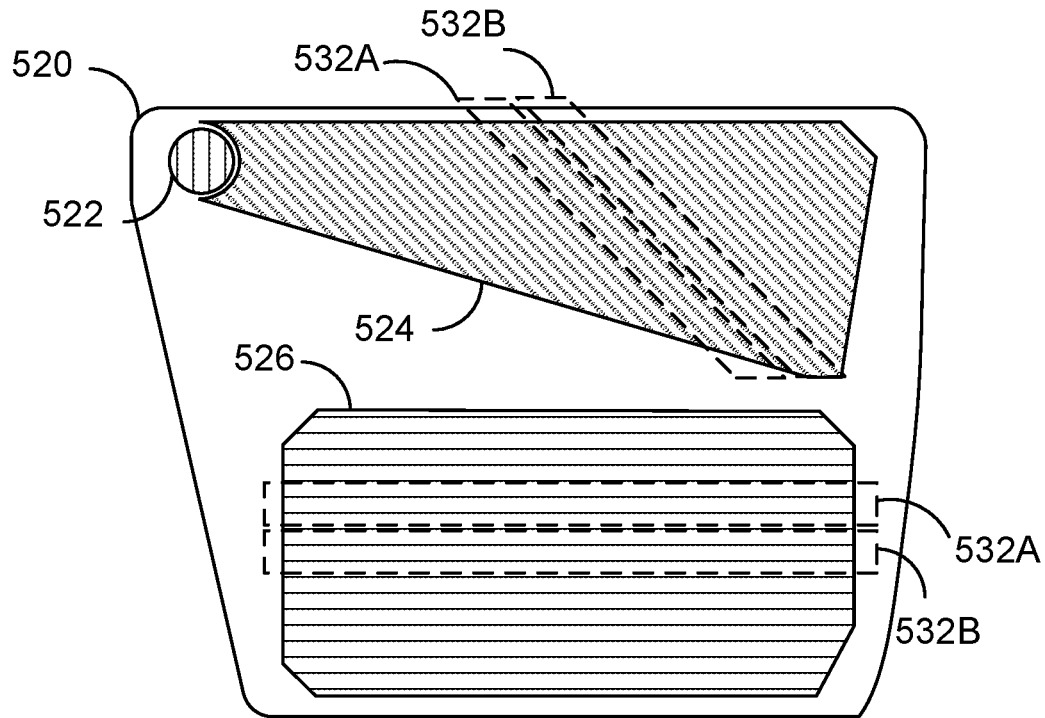
FIG. 5B schematically shows an example waveguide comprising a folding grating having individually controllable zones.

In other examples, instead of a single two-dimensional controllable output coupler, two sets of controllable one-dimensional gratings may be used. FIG. 5B schematically shows an example waveguide comprising two one-dimensional gratings. Waveguide 520 includes an input coupler 522, a turning grating 524 configured to fold the optical path and expand a pupil along a first dimension, and an output coupler 526 configured to expand the pupil along the second dimension.

One or both of turning grating 534 and output coupling grating 536 may comprise a switchable grating. As such, one or both of turning grating 534 and output coupling grating 536 may include a plurality of dynamically controllable diffractive zones to selectively diffract light toward a corresponding location of an output coupler for emission. FIG. 5B schematically depicts dynamically controllable diffractive zones 530A and 530B for grating 524, and dynamically controllable diffractive zones 532A and 532B for grating 526 Each dynamically controllable diffractive zone may comprise a switchable polarization grating.

Where turning grating 524 comprises dynamically controllable diffractive zones, each zone can be controlled to selectively direct light toward outcoupler 526. Likewise, where outcoupler 526 comprises dynamically controllable diffractive zone, each zone can be controlled to selectively outcouple light. Where turning grating 524 and outcoupler 526 are both controllable, two-dimensional zone control may be achieved. In some examples, only one of turning grating 534 and output coupling grating 536 may be switchable. While two zones are schematically depicted in FIG. 5B for each of turning grating 524 and outcoupler 526 for clarity, each may have any suitable number of dynamically controllable diffractive zones. It will be understood that the shapes of zones 530A, 530B, 532A and 532B shown in FIG. 5B are schematic in nature and are not meant to represent any particular shape. In some examples, zones 530A, 530B, 532A and 532B may have complex shapes, or even have a different shape & position for each angle within the waveguide. Backwards ray tracing from the eye to the image source, for example, may be used to determine a suitable shape and position of each zone for each angle. In some examples, zone shapes may be based upon factors such as a determined optimal shape balanced with manufacturing considerations.

Any suitable controllable grating structure may be used to form the dynamically controllable output coupling elements of output couplers 412 and 500. In some examples, a switchable output coupling element may comprise a switchable polarization grating, such as a switchable Bragg grating. In some examples, a rolling shutter may be used. Use of a shutter may limit the available light paths, block unwanted light, and/or improve image quality. Such a shutter may include a switchable Bragg grating with either discrete or continuous shutter zones. In other examples, an amplitude shutter that blocks light may be used. This may allow for improved waveguide performance (e.g., increased FOV, increased resolution). For VR displays, the user does not need to see through the display, so shutters that are default-opaque may be used. In some examples, pixels that are being blocked by the rolling shutter may be turned off so that no light is lost.

A switchable Bragg grating may comprise birefringent molecules that can be selectively rotated by application of an electric field via electrodes positioned adjacent to the birefringent molecules. Based upon the orientation of the birefringent molecules, the switchable Bragg grating may selectively form a region with a periodically varying index of refraction, or with an index-matched structure with no periodic characteristic. Referring to FIGS. 4A and 4B, in the deactivated state (cross-hatched pattern), the dynamically controllable output coupling elements are controlled to exhibit an index matched state, thereby maintaining total internal reflection, while in the activated state, the dynamically controllable output coupling elements are controlled to exhibit a periodic index of refraction, causing light to be outcoupled.

The diffraction efficiency of a switchable Bragg grating may be varied by controlling a duty cycle at which the grating is switched on and off, as the more time the grating is in a periodic configuration, the more photons will pass through. In some examples, the grating may include multiple types of liquid crystal molecule arrangements (e.g., differing arrangements and/or layer thicknesses), either separately or within a common cell. The efficiency of such a grating can be modulated by changing the rotation of one liquid crystal layer of molecules relative to the other thus changing the refractive index modulation through the thickness of the grating over time.

Inducing rotation of a birefringent molecule takes a finite amount of time, both to activate and to relax after activation. Thus, the activation and relaxation times may be mapped by the controller to help generate a desired modulation response. Controlling the efficiency of each zone may allow a plurality of individually controllable output coupling elements to be controlled to exhibit end-to-end taper in grating efficiency based on distance to the image source.

Additionally or alternatively to diffractive controllable output coupling elements, in other examples, controllable refractive or reflective output coupling elements may be utilized in a dynamically controllable output coupling element. For example, switchable mirrors may be used.

In the examples of FIGS. 4A and 4B, a full image may be output by image source 404 for a duration of an eye integration period, and multiple zones of output coupler 412 may be activated/deactivated in a static manner for the duration of the eye integration period. In other examples, more efficient and adaptable image display may be accomplished by using controllable output coupling elements that are activated in a scanning pattern, synchronized with the output of image light by pixels of an image source, to scan out a field of to an eye box positioned based upon eye tracking. For example, the image source may be configured to selectively illuminate zones that are switched on and not illuminate one or more other zones. This permits images to be displayed while outputting only a portion of pixels of an image source at any particular instance. Thus, such examples may provide increased efficiency as compared to outputting an entire image for each eye integration period at a similar light intensity, and may allow for generation of higher intensity images at the same power level, or for a reduction in power without reducing overall intensity. In addition, this may limit the optical paths a ray can take from the image source to the eye, consequently blocking stray light and noise rays (e.g., light from unwanted higher orders) from reaching a user's eye, thereby improving image contrast.

FIGS. 6A-6F schematically show schematically show an example near-eye display device 600 configured to display a projected image by sequentially activating dynamically controllable output coupling elements synchronously with the display of portions of an image corresponding to the output coupling elements. Near eye display device 600 includes controller 602, image source 604, lens 606, waveguide 608, input coupler 610, dynamically controllable output coupler 612, and eye tracking system 614. Dynamically controllable output coupler 612 includes a plurality of individually controllable zones 620, 622, 624, 626, 628, 630, 632, and 634, each zone including a dynamically controllable output coupling element.

Light output from waveguide 608 via activated zones may be directed to eye box 616, corresponding to a current position of eye 618 as determined by eye tracking system 614. Control of individually controllable output coupling elements in each zone is synchronized with the output of image portions by image source 604 to scan out a field of view to eye box 616. As mentioned above, this may allow for a reduction in wasted power as compared to traditional waveguide architectures. This may allow for the relaxation of some manufacturing constraints, as switching off sections of output coupler 612 may reduce the appearance of artifacts, such as higher orders and/or noise orders, that may be visible if multiple zones are activated simultaneously.

Figure 6A:
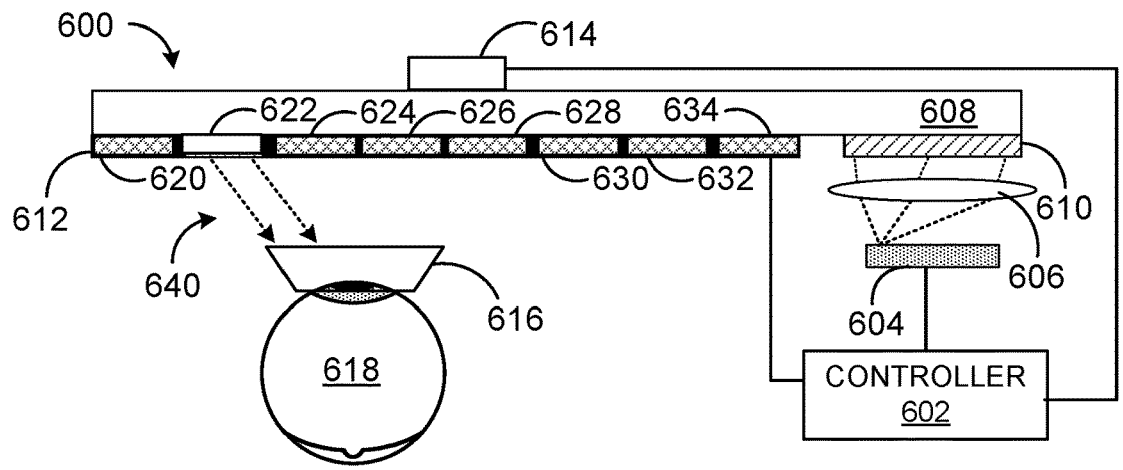
FIGS. 6A-6F schematically show an example operation of an output coupler comprising dynamically controllable output coupling elements.
Figure 6B:
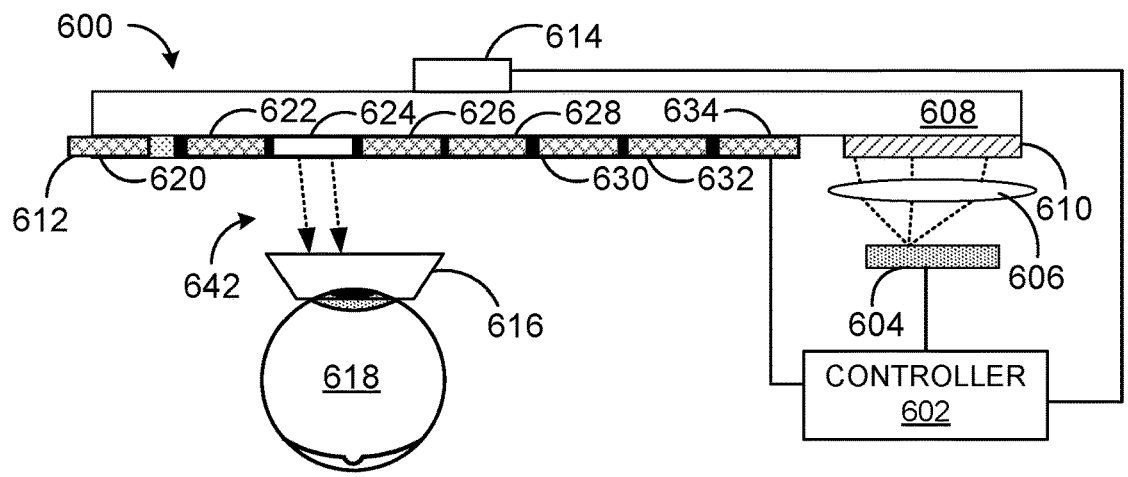
Figure 6C:
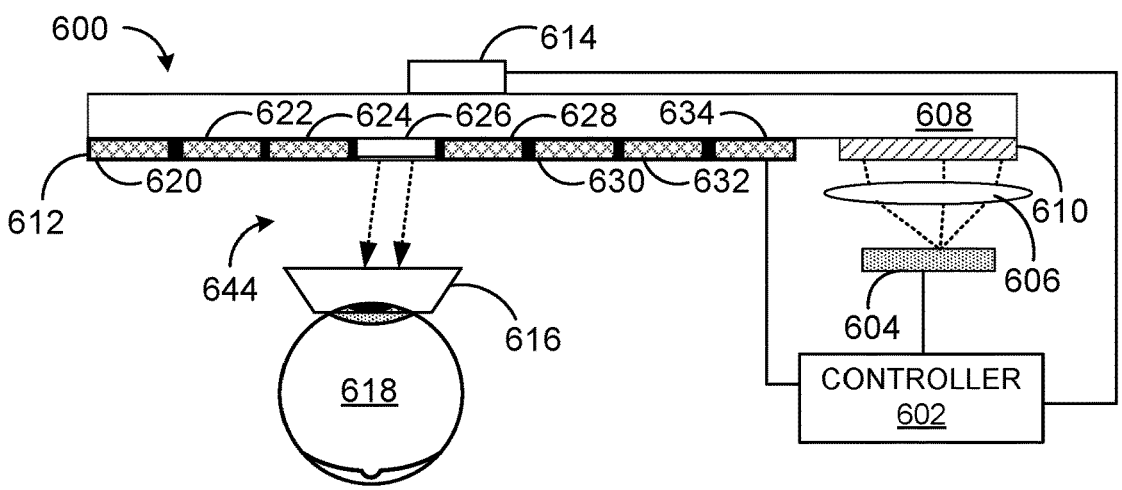
Figure 6D:
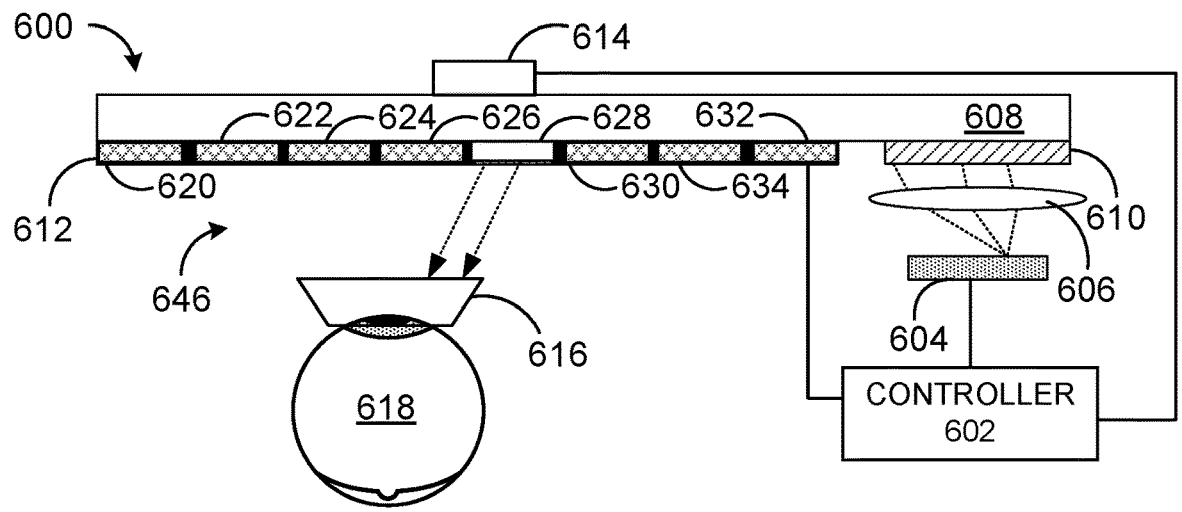
Figure 6E:
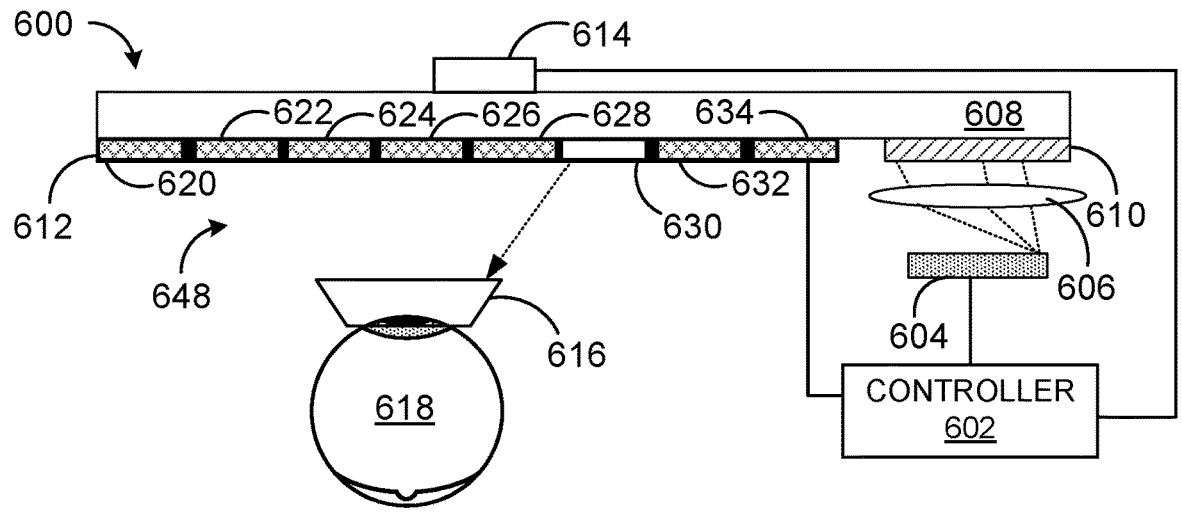
Figure 6F:
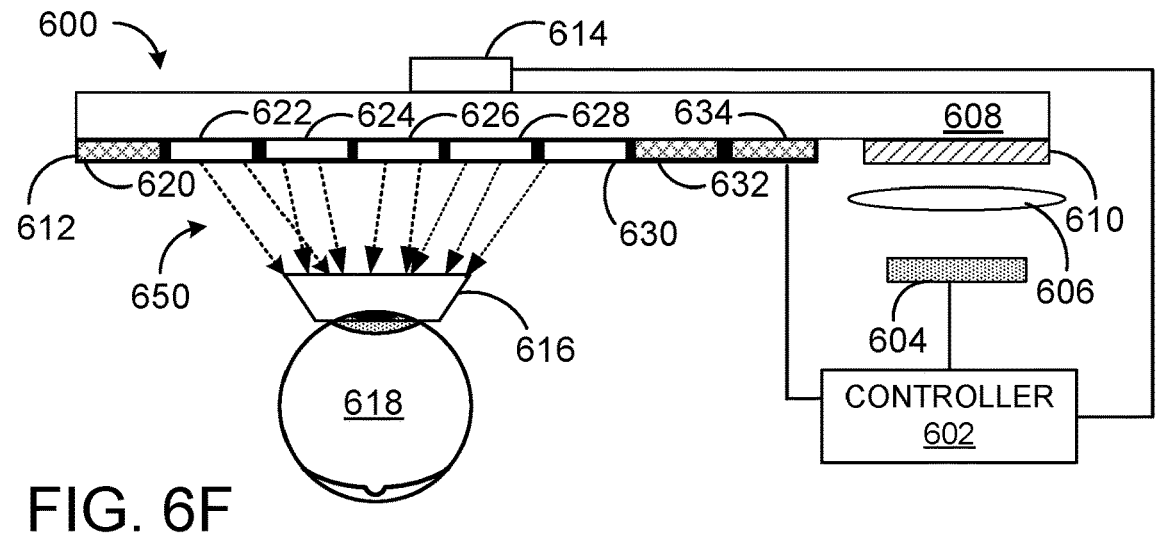

FIGS. 6A-6E illustrate an example display of a projected image by synchronously scanning the activation of controllable output coupling elements and outputting corresponding portions of a projected image. First, in FIG. 6A, zone 622 is activated along with the projection of a first image portion by image source 602. This directs light rays 640 towards eye box 616. In FIG. 6B, zone 624 is activated, directing light rays 642 corresponding to a second image portion towards eye box 616. In FIG. 6C, zone 626 is activated along with the projection of image portion 624A, directing light rays 644 corresponding to a third image portion towards eye box 616. In FIG. 6D, zone 628 is activated, corresponding to a fourth image portion. This directs light rays 646 towards eye box 616. In FIG. 6E, zone 630 is activated, corresponding to the fifth image portion, and directing light rays 648 to eye box 616. Zones 622, 624, 626, 628 and 630 in this example may be sequentially activated in the order shown within the integration time of eye 618, or may be activated in any other suitable order. As shown in FIG. 6F, combined light rays 650 thus are realized by eye 618 so that the image projected from image source 604 is perceived. FIG. 6F omits the input rays for clarity. In this way, light rays are directed into eye box 616 from different angles and different zones for a given eye position in a time-multiplexed manner over the eye integration time. In this example, zones are activated linearly, from the periphery to more centrally located zones. In other examples, this progression may be reversed, may be random, or may follow any other suitable pattern.

In some examples, the activation of individual zones may be coordinated with the scanning patterns and frequencies of a corresponding image source. For example, in a resonant MEMS display device having fast and slow mirror scan directions, a slow mirror scan direction may operate on the order of 120 Hz, as an example frequency. Thus, activation of individually controllable zones for an image frame may be time multiplexed within this frequency cycle. Further, in some examples, an emissive image panel or a spatial light modulator may be operated such that only portions of an image that are actively projecting into activated zones of output coupler 612 are produced within the eye integration period. For example, the $V_{sync}$ or $H_{sync}$ of a pixelated display may be synchronized to the activation of individually controllable zones.

As the eye moves, the activated zones and displayed image portions may be adjusted to generate an eye box at the updated eye position. Thus, the correspondence between zones of dynamically controllable output coupler 612 and displayed image portions may vary as the eye position moves, as illustrated in FIGS. 4A-4B above.

Figure 7:
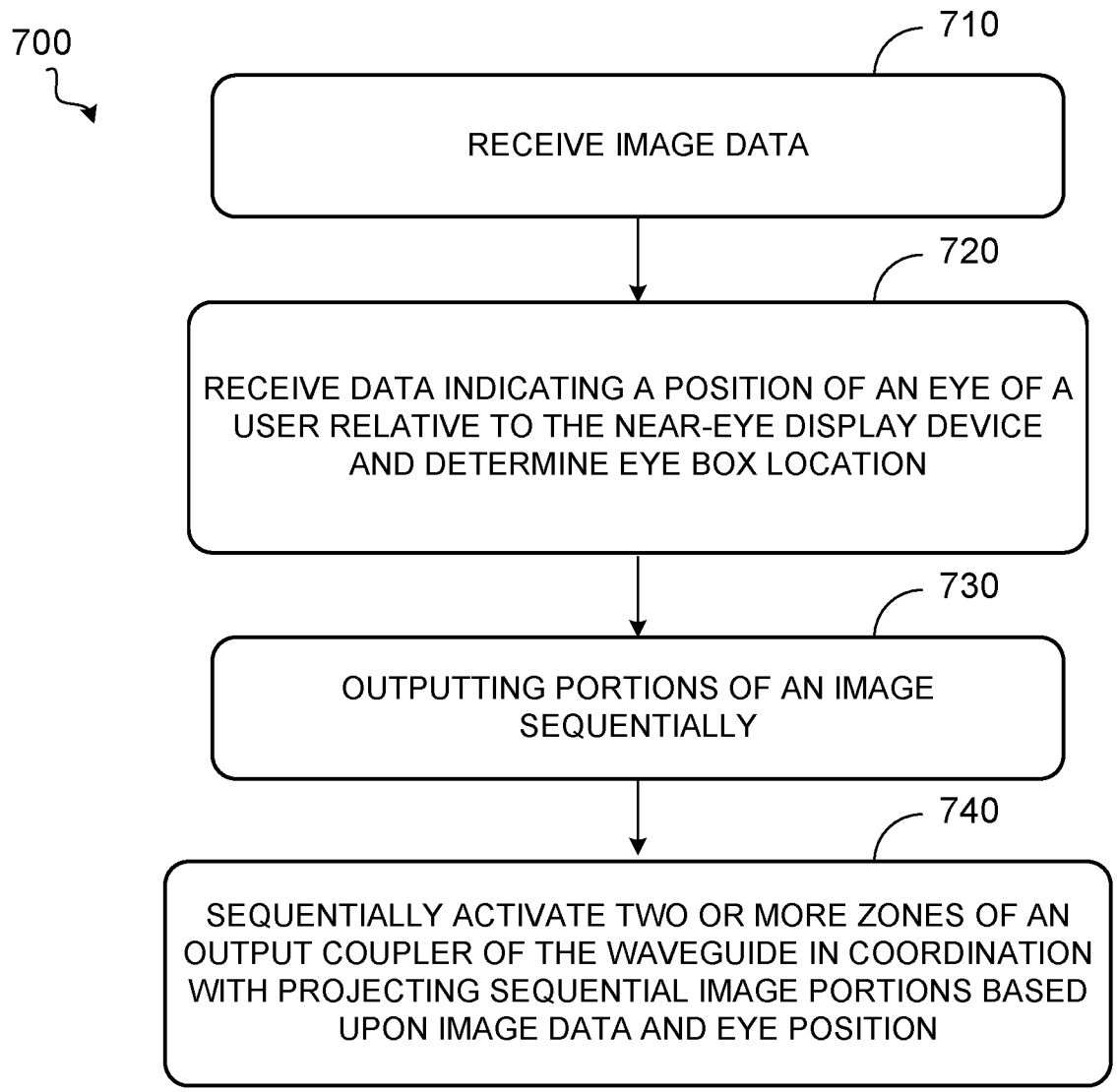
FIG. 7 shows an example method for operating a near-eye display device comprising a waveguide with dynamically controllable output coupling elements.

FIG. 7 shows a flow diagram illustrating an example method 700 for operating a near-eye display device. Method 700 may be enacted on a near-eye display device and executed by a controller, such as controller 602 of near-eye display device 600. At 710, method 700 includes receiving image data, such as from local or remote storage. At 720, method 700 includes receiving data indicating a position of an eye of a user relative to the near-eye display device. For example, data indicating a position of the eye of the user may be received from an eye-tracking device that is physically and/or communicatively coupled to the near-eye display device. The position of the user's eye may be updated at any suitable frame rate. The position of the eye may include a position in three dimensions relative to the near-eye display device, and/or a respective waveguide. The position of the eye may further include an orientation and/or conformation of the eye and/or pupil relative to the near-eye display device, and/or a respective waveguide.

Based on the eye position data, a location of an eye box in which the user's pupil will be positioned is determined. Further, in some examples, a size of an eye box also may be determined. The eye box location may be determined in any suitable manner. For example, zones that are to be activated to form an eye box at a selected eye location may be mapped to the eye location and stored in a lookup table. As another example, zones to activate to form an eye box may be computed in real time geometrically.

At 730, method 700 comprises outputting, from an image source, portions of an image sequentially. The sequential image portions may be output in any suitable spatial order, and may be output at a sufficient rate for all image portions to be output within a single cycle of an image frame rate. Further, at 740, method 700 includes sequentially activating two or more zones of an output coupler of the waveguide in coordination with outputting sequential image portions to the input coupler of the waveguide, based upon the image data and determined eye position. As described above, the zones may be activated by controlling a dynamically controllable output coupling element in each zone. In some examples, the two or more zones are spatially contiguous, while in other examples, the two or more zones are spatially separated. Further, the two or more zones can be activated in sequence along a geometrical direction of the zones, or out of sequence, based upon an order in which image portions are output. As a user's eye moves, the eye box to which the image portions are output may move as well, by adjusting a mapping of image portions to the dynamically controllable output coupling elements based upon the new eye location.

In some examples, image data may be used to anticipate changes in gaze direction of the eye, and thus changes in the position of the eye box. For example, if new objects are about to be rendered, the user's eye may be considered likely to shift focus towards those new objects. If objects are being faded out, the user may shift their gaze elsewhere. If certain portions of the display are not presenting content, the corresponding zones may be turned deactivated, and illumination to those zones may be significantly reduced. Thus, an eye box can be positioned and/or sized accordingly. Further, in some examples, a central (e.g., nasal) FOV may be managed differently than a peripheral FOV. For example, the peripheral FOV may be rendered in lower resolution, but be more time responsive. As such imagery could be updated more rapidly, but with less precision in intensity.

Further, in some examples, output coupler zones and image pixels may be activated based on data stored in a look-up table for desired spatial and angular light transmission. A control loop for activating individual pixels may occur rapidly, such as at 1000 Hz or more to generate an image frame rate on the order of 100 Hz.

In the preceding examples, the angle of light going into the waveguide is the same as the angle of light coming out of the waveguide, though the rays may be replicated, as described. Waveguides, in general, are constrained to a specific angular range, which is limited by the refractive index of the waveguide. However, in some examples, a waveguide may be configured to produce an extended range of ray angles through the output coupler, thus broadening the angles of output light to include angles that are not present at input. By increasing the angular range (field-of-view) of the display, the effective resolution of the display system is also increased.

Figure 8:
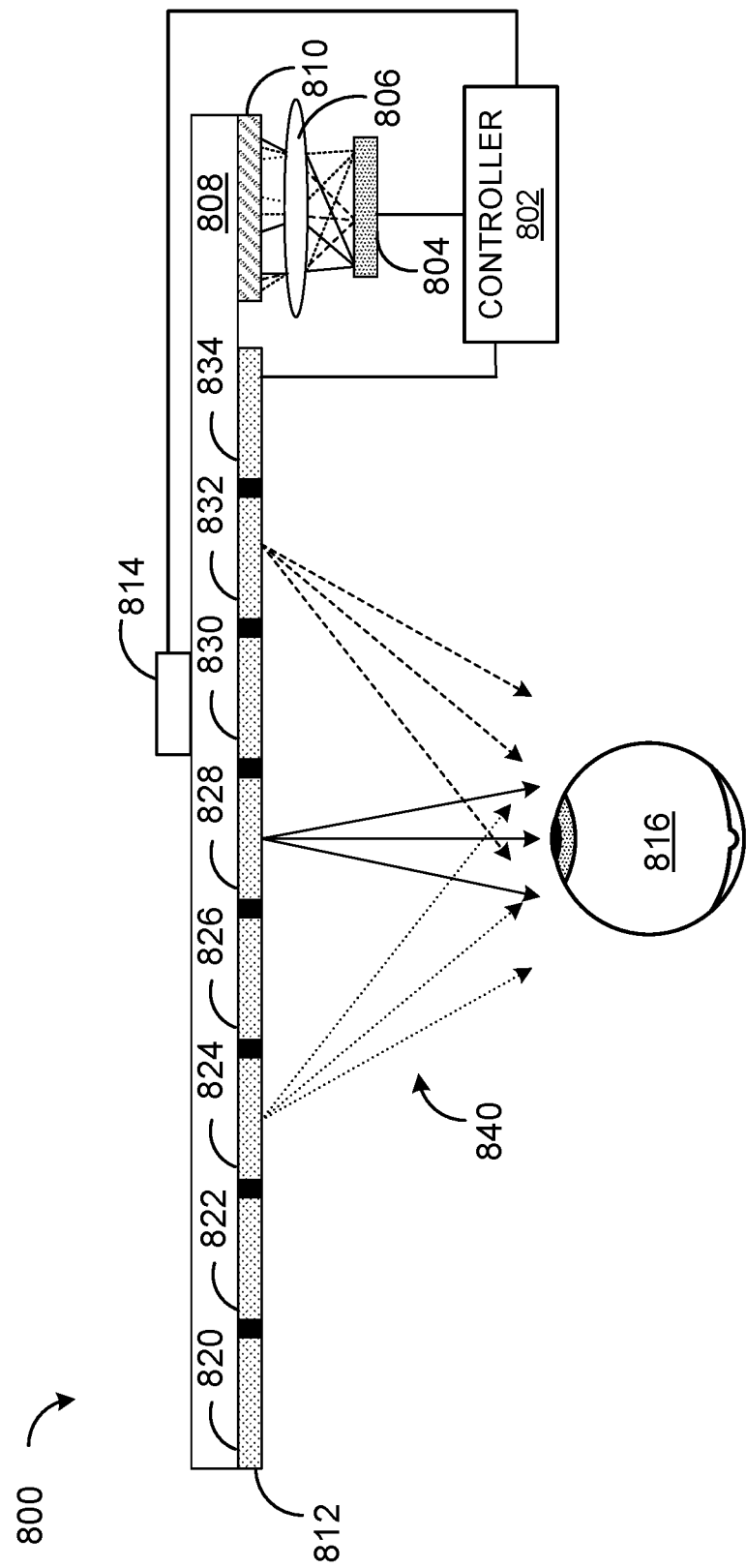
FIG. 8 schematically shows an example near-eye display device comprising an output coupler configured to bias output light angles.

FIG. 8 schematically shows an example near-eye display device 800 configured to produce an extended range of ray angles. Near eye display device 800 includes controller 802, image source 804, lens 806, waveguide 808, input coupler 810, and output coupler 812. Output coupler 812 includes a plurality of individually controllable zones 820, 822, 824, 826, 828, 830, 832, and 834.

In this example, each individually controllable zone may be configured to provide a biased output angle of light, offset to cover a range of eye box positions for that zone's spatial location. In the example shown in FIG. 8, individually controllable zones 824, 828, and 832 are shown emitting repeated light rays 840 towards eye 816 at its current position. Each zone may be biased to output light over a predetermined offset angle range.

Biasing an output angle of each zone allows for light to be specifically directed towards the eye box, and also to be directed away from the peripheral fringes, thus reducing wasted light, as described with regard to FIG. 3C. In some examples, each zone of output coupler 812 may include a biasing grating. In some such examples, only some zones, such as the zones towards the peripheries of the waveguide (e.g., zones 820, 834) are configured for such biasing, while other, more centrally located zones do not include such biasing.

Figure 9:
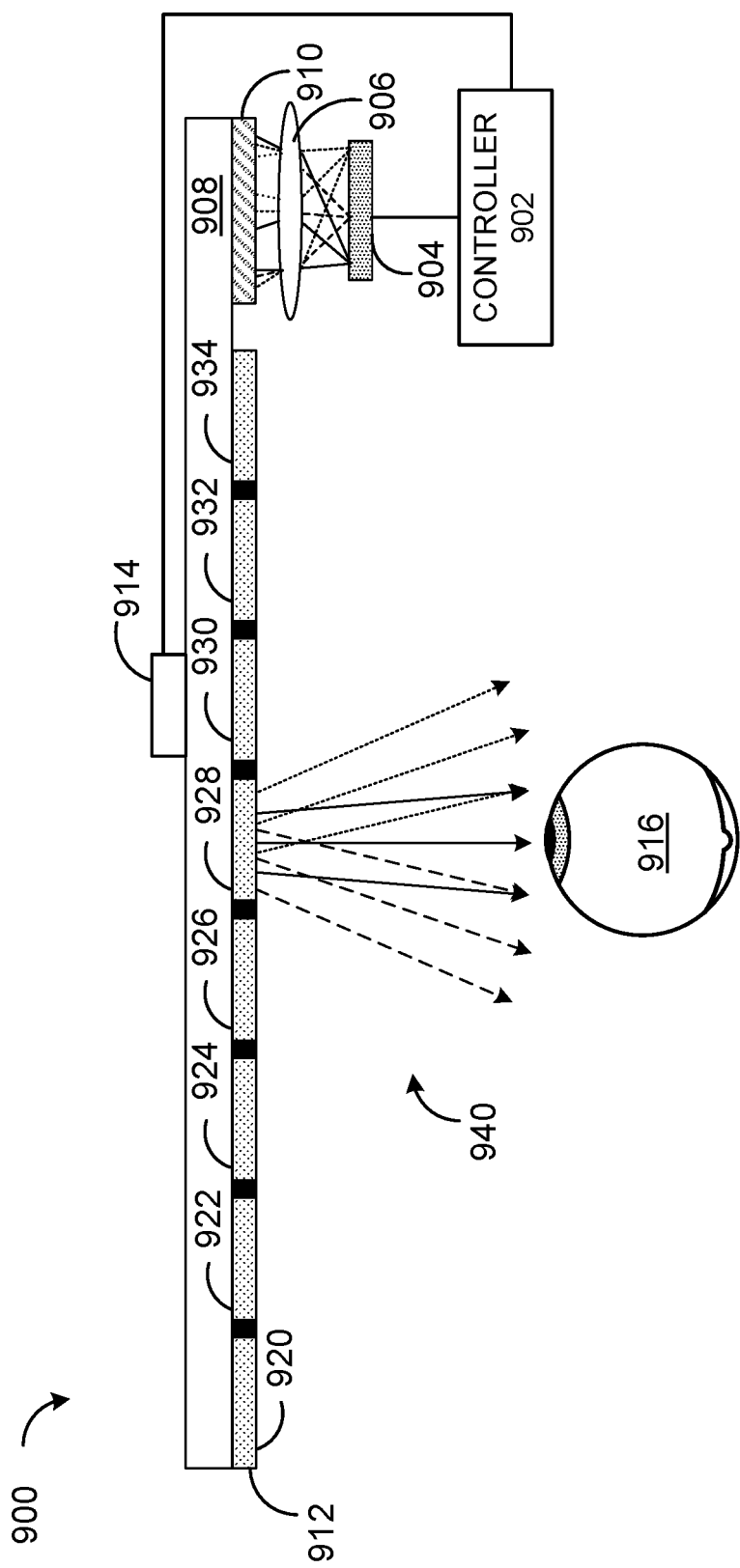
FIG. 9 schematically shows a near-eye display device comprising an output coupler with a multiple order grating.

In some examples, multiple order output coupler gratings may be used to increase a size of an FOV and eye box. Such gratings may be configured to allow a single diffraction order can reach any given eye box to avoid unwanted interference, such as ghost images. The controller may be calibrated to compensate for the differing offsets of each zone. FIG. 9 schematically shows an example near-eye display device 900 comprising multiple order output coupler gratings. Near eye display device 900 includes controller 902, image source 904, lens 906, waveguide 908, input coupler 910, and output coupler 912. Output coupler 912 includes a plurality of individually controllable zones 920, 922, 924, 926, 928, 930, 932, and 934, one or more zones each comprising a multiple order output coupling grating. As an example, zone 928 is shown emitting multiple orders of diffracted light 940 towards eye 916, wherein one order is represented by vertical rays and another order is represented by diagonal rays.

Figure 10:
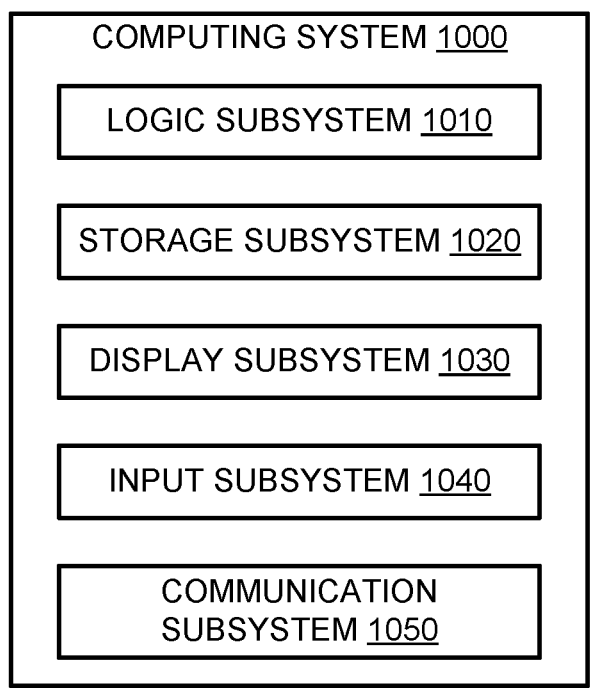
FIG. 10 shows a block diagram of an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices. For example, near-eye display device 100, near-eye display device 300, near-eye display device 400, near-eye display device 500, near-eye display device 600, near-eye display device 800, and near-eye display device 900 are examples of computing system 1000.

Computing system 1000 includes a logic machine 1010 and a storage machine 1020. Computing system 1000 may optionally include a display subsystem 1030, input subsystem 1040, communication subsystem 1050, and/or other components not shown in FIG. 10.

Logic machine 1010 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1020 includes one or more physical devices configured to hold instructions executable by the logic machine to implement the methods and processes described herein. When such methods and processes are implemented, the state of storage machine 1020 may be transformed—e.g., to hold different data.

Storage machine 1020 may include removable and/or built-in devices. Storage machine 1020 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1020 may include volatile, nonvolatile, dynamic, static, read/write, read-only, random-access, sequential-access, location-addressable, file-addressable, and/or content-addressable devices.

It will be appreciated that storage machine 1020 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1010 and storage machine 1020 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1030 may be used to present a visual representation of data held by storage machine 1020. This visual representation may take the form of a graphical user interface (GUI). As the herein described methods and processes change the data held by the storage machine, and thus transform the state of the storage machine, the state of display subsystem 1030 may likewise be transformed to visually represent changes in the underlying data. Display subsystem 1030 may include one or more display devices utilizing virtually any type of technology. Such display devices may be combined with logic machine 1010 and/or storage machine 1020 in a shared enclosure, or such display devices may be peripheral display devices.

When included, input subsystem 1040 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracking system, accelerometer, and/or gyroscope for motion detection and/or intent recognition; as well as electric-field sensing componentry for assessing brain activity.

When included, communication subsystem 1050 may be configured to communicatively couple computing system 1000 with one or more other computing devices. Communication subsystem 1050 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

In another example, a near-eye display device comprises an eye tracking system configured to determine a position of an eye of a user relative to the near-eye display device; a waveguide including at least an input coupler and an output coupler, the output coupler including a plurality of zones, each zone activatable via a dynamically controllable output coupling element of the zone; an image source configured to output image light to the input coupler; and a controller configured to selectively activate one or more zones of the output coupler based at least on the position of the eye. In such an example, or any other example, the image source is additionally or alternatively configured to selectively illuminate zones that are switched on and not illuminate one or more other zones. In any of the preceding examples, or any other example, the controller is additionally or alternatively configured to sequentially activate zones to generate a single image frame at a pupil of the eye of the user. In any of the preceding examples, or any other example, the controller is additionally or alternatively configured to selectively adjust an output efficiency of each dynamically controllable output coupling element via duty cycle adjustment. In any of the preceding examples, or any other example, the image source additionally or alternatively comprises a spatial light modulator or an emissive display panel. In any of the preceding examples, or any other example, the image source additionally or alternatively comprises a scanning image source. In any of the preceding examples, or any other example, each dynamically controllable output coupling element additionally or alternatively includes a switchable polarization grating. In any of the preceding examples, or any other example, the switchable polarization grating additionally or alternatively comprises a switchable Bragg grating. In any of the preceding examples, or any other example, each zone is additionally or alternatively biased to output light over a predetermined offset angle range. In any of the preceding examples, or any other example, the dynamically controllable output coupling element additionally or alternatively includes a multiple order grating. In any of the preceding examples, or any other example, at least some zones are additionally or alternatively biased not to output light in absence of a control signal. The technical effect of implementing such a device is a reduced consumption of power by the device.

In another example, a method for operating a near-eye display device comprises receiving data indicating a position of an eye of a user relative to the near-eye display device; sequentially outputting image light from two or more different image source locations to an input coupler of a waveguide; and sequentially activating two or more zones of an output coupler of the waveguide in coordination with sequentially outputting the image light from the two or more different image source locations to direct the image light to an eye box, each zone of the output coupler comprising a dynamically controllable output coupling element. In such an example, or any other example, the method additionally or alternatively comprising selectively adjusting an output efficiency of one or more zones via controlling a duty cycle of the dynamically controllable output coupling element in each of the one or more zones. In any of the preceding examples, or any other example, sequentially outputting the image light from the two or more different image source locations additionally or alternatively comprises outputting the image light from two or more different locations on a display panel. In any of the preceding examples, or any other example, sequentially outputting the image light from the two or more different image source locations additionally or alternatively comprises outputting the image light from two or more different raster scan locations. In any of the preceding examples, or any other example, sequentially activating the two or more zones additionally or alternatively comprises sequentially activating a switchable polarization grating in each zone of the two or more zones. The technical effect of implementing such a method is an increase in operating efficiency by the display device.

In yet another example, a near-eye display device, comprises an eye tracking system configured to determine a position of an eye of a user relative to the near-eye display device; a waveguide including a grating, the grating including a plurality of dynamically controllable diffractive zones to selectively diffract light toward a corresponding location of an output coupler for emission; an image source configured to output image light to the input coupler; and a controller configured to selectively activate one or more zones of the grating based at least on the position of the eye. In such an example, or any other example the grating additionally or alternatively comprises a turning grating. In any of the preceding examples, or any other example, each dynamically controllable diffractive zone additionally or alternatively comprises a switchable polarization grating. In any of the preceding examples, or any other example, the output coupler additionally or alternatively comprises a plurality of dynamically controllable output coupling elements. The technical effect of implementing such a device is a reduced consumption of power by the device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye display device, comprising:
    an eye tracking system configured to determine a position of an eye of a user relative to the near-eye display device;
    a waveguide including at least an input coupler and an output coupler, the output coupler including a plurality of zones, each zone activatable via a dynamically controllable output coupling element of the zone;
    an image source configured to output image light to the input coupler; and
    a controller configured to selectively activate one or more zones of the output coupler based at least on the position of the eye.

2. The near-eye display device of claim 1, wherein the image source is further configured to selectively illuminate zones that are switched on and not illuminate one or more other zones.

3. The near-eye display device of claim 1, wherein the controller is further configured to sequentially activate zones to generate a single image frame at a pupil of the eye of the user.

4. The near-eye display device of claim 1, wherein the controller is further configured to selectively adjust an output efficiency of each dynamically controllable output coupling element via duty cycle adjustment.

5. The near-eye display device of claim 1, wherein the image source comprises a spatial light modulator or an emissive display panel.

6. The near-eye display device of claim 1, wherein the image source comprises a scanning image source.

7. The near-eye display device of claim 1, wherein each dynamically controllable output coupling element includes a switchable polarization grating.

8. The near-eye display device of claim 7, wherein the switchable polarization grating comprises a switchable Bragg grating.

9. The near-eye display device of claim 1, wherein each zone is biased to output light over a predetermined offset angle range.

10. The near-eye display device of claim 1, wherein the dynamically controllable output coupling element includes a multiple order grating.

11. The near-eye display device of claim 1, wherein at least some zones are biased not to output light in absence of a control signal.

12. A method for operating a near-eye display device, comprising:
    receiving data indicating a position of an eye of a user relative to the near-eye display device;
    sequentially outputting image light from two or more different portions of an image source to an input coupler of a waveguide; and
    sequentially activating two or more zones of an output coupler of the waveguide in coordination with sequentially outputting the image light from the two or more different portions of the image source to direct the image light to an eye box, each zone of the output coupler comprising a dynamically controllable output coupling element.

13. The method of claim 12, further comprising selectively adjusting an output efficiency of one or more zones via controlling a duty cycle of the dynamically controllable output coupling element in each of the one or more zones.

14. The method of claim 12, wherein sequentially outputting the image light from the two or more different portions of the image source comprises outputting the image light from two or more different locations on a display panel.

15. The method of claim 12, wherein sequentially outputting the image light from the two or more different portions of the image source comprises outputting the image light from two or more different raster scan portions.

16. The method of claim 12, wherein sequentially activating the two or more zones comprises sequentially activating a switchable polarization grating in each zone of the two or more zones.

17. A near-eye display device, comprising:
    an eye tracking system configured to determine a position of an eye of a user relative to the near-eye display device;
    a waveguide including a grating, the grating including a plurality of dynamically controllable diffractive zones to selectively diffract light toward a corresponding location of an output coupler for emission;
    an image source configured to output image light to the input coupler; and
    a controller configured to selectively activate one or more zones of the grating based at least on the position of the eye.

18. The near-eye display device of claim 17, wherein the grating comprises a turning grating.

19. The near-eye display device of claim 17, wherein each dynamically controllable diffractive zone comprises a switchable polarization grating.

20. The near-eye display device of claim 17, wherein the output coupler further comprises a plurality of dynamically controllable output coupling elements.

* * * * *